United States Patent [19]
Akita et al.

[11] Patent Number: 4,550,142
[45] Date of Patent: Oct. 29, 1985

[54] RUBBER COMPOSITION

[75] Inventors: Shuichi Akita, Kamakura; Toshio Namizuka, Yokohama, both of Japan

[73] Assignee: Nippon Zeon Co. Ltd., Tokyo, Japan

[21] Appl. No.: 488,817

[22] Filed: Apr. 26, 1983

[30] Foreign Application Priority Data

Apr. 30, 1982 [JP] Japan ................................. 57-72680

[51] Int. Cl.$^4$ ............................................... C08F 8/30
[52] U.S. Cl. ...................................... 525/236; 525/237; 525/332.8; 525/332.9; 525/333.1; 525/333.2; 525/359.3; 525/379; 525/381; 525/382; 525/383
[58] Field of Search ...................... 525/382, 383, 359.3, 525/379, 381, 236, 237

[56] References Cited

U.S. PATENT DOCUMENTS

| | | | |
|---|---|---|---|
| 2,524,977 | 10/1950 | Holbrook et al. | 525/382 |
| 3,471,460 | 10/1969 | Rees | 525/382 |
| 3,787,302 | 1/1974 | Ijichi et al. | 525/383 |

*Primary Examiner*—Joseph L. Schofer
*Assistant Examiner*—Bernard Lipman
*Attorney, Agent, or Firm*—Sherman & Shalloway

[57] ABSTRACT

A rubber composition comprising at least 10% by weight, based on the entire rubber component, of a highly unsaturated polymer rubber having a benzophenone introduced into its molecular chains in an amount of at least 0.1 mole per mole of the rubber molecular chains.

12 Claims, No Drawings

RUBBER COMPOSITION

This application is related to application Ser. No. 630,399 filed July 13, 1984, now abandoned, which is a continuation-in-part of application Ser. No. 475,500 filed Mar. 15, 1983, now abandoned.

This invention relates to a rubber composition having an improved rebound. More specifically, this invention relates to a rubber composition comprising as a rubber component a highly unsaturated polymer rubber having a benzophenone introduced into its molecular chains.

In recent years, reduction of the rolling resistance of a tire and improvement of its braking property on a wet road surface, i.e. its wet skid resistance, have been strongly desired from the standpoint of the low fuel cost and safety of automobiles. Generally, these properties of a tire are considered correspondingly to the dynamic viscoelastic properties of a tread rubber material, and are known to be incompatible properties (see, for example, Transactions of I.R.I., Vol. 40, pages 239–256, 1964).

To reduce the rolling resistance of tires, the tread rubber material should have a high rebound. In view of the running condition of an automobile, the rebound should be evaluated at temperatures of from 50° C. to about 70° C. On the other hand, in order to improve the braking property of a tire on a wet road surface, which is an important property with regard to the safety of a car, the tire should have high wet skid resistance measured by a British portable skid tester. Accordingly, the tread rubber material is required to have a large energy loss as a frictional resistance which occurs when the tire is allowed to slide on a road surface while applying the brakes.

Heretofore, a blend of a styrene/butadiene copolymer rubber having a combined styrene content of 20 to 25% by weight and a high cis-1,4-polybutadiene rubber having a cis 1,4-linkage content of at least 80 mole% has been used to provide a compromise between these two incompatible properties. But this blend has not proved to be entirely satisfactory with regard to wet skid resistance. Attempts have been made to increase wet skid resistance by mixing this blend with a resin or rubber having a high glass transition temperature, but resulted in a reduced rebound. Hence, a further improvement has been desired.

It is an object of this invention to provide such an improvement.

The present inventors surprisingly found that a rubber composition containing at least 10% by weight, based on the entire rubber component, of a highly unsaturated polymer rubber having a benzophenone introduced into its molecular chains obtained by reacting an alkali metal-added highly unsaturated polymer rubber (the term "alkali metal-added highly unsaturated polymer rubber" denotes living diene-type polymer rubbers having an alkali metal bonded to the ends of the molecular chains, the highly unsaturated polymer rubbers having an alkali metal added randomly to the molecular chains) with a benzophenone has equal wet skid resistance to, and a much higher rebound than, a rubber composition containing as a rubber component a highly unsaturated polymer rubber having no benzophenone introduced thereinto.

The present invention provides a composition which, when used as a tire, reconciles rolling resistance and braking property on a wet road surface, i.e. wet skid resistance, which are important properties of tires in recent years, at high levels. If a benzophenone is introduced into a styrene/butadiene copolymer rubber having a combined styrene content of 20 to 25% by weight which has wet skid resistance at the required level, its rebound can be markedly improved without reducing its wet skid resistance. Thus, a composition having the above two properties satisfactorily at high levels can be obtained by using the aforesaid rubber alone. Furthermore, if a rubber obtained by introducing a benzophenone to polybutadiene rubber having a cis 1,4-linkage content of at least 80 mole% and a high rebound is combined with a styrene/butadiene copolymer rubber having a combined styrene content of at least 30% by weight which has a sufficient level of wet skid resistance but a low rebound, a composition which has the above two properties satisfactorily at high levels can be obtained. If a rubber obtained by introducing a benzophenone into a styrene/butadiene copolymer rubber having a combined styrene content of at least 30% by weight is blended with polybutadiene rubber having a cis 1,4-linkage content of at least 80 mole% by weight, a composition which has the aforesaid two properties satisfactorily at high levels can be obtained. Furthermore, if a rubber obtained by introducing a benzophenone into polybutadiene rubber having a cis 1,4-linkage content of at least 80 mole% is mixed with a rubber obtained by introducing a benzophenone into a styrene/butadiene copolymer rubber having a combined styrene content of at least 30% by weight, a composition which has the above two properties satisfactorily at high levels can be obtained.

The composition of this invention can also be used when a high rebound is required while a high wet skid resistance value is not particularly necessary.

The highly unsaturated polymer rubber into which a benzophenone is to be introduced in the present invention includes (co)polymer rubbers having diene units such as butadiene, isoprene and 1,3-pentadiene, and (co)polymer rubbers of cycloolefins such as cyclopentene and cyclooctene, which have a carbon-carbon double bond in the polymer chain, irrespective of the method of polymerization (solution polymerization, emulsion polymerization, etc.). Specific examples are polybutadiene rubber (having a high cis 1,4-linkage content, a low cis 1,4-linkage content, a low and a high 1,2-linkage content, etc.), polyisoprene rubber (having a high cis 1,4-linkage content, a low cis 1,4-linkage content, etc.), polychloroprene rubber, a styrene/butadiene copolymer rubber (having a combined styrene content of not more than 50% by weight, a low and a high 1,2-linkage content, etc.), a styrene/isoprene copolymer rubber (for example, having a combined styrene content of not more than 50% by weight), butadiene/isoprene copolymer rubber, acrylonitrile/butadiene copolymer rubber, polypentadiene rubber, butadiene/piperylene copolymer rubber, butadiene/propylene copolymer rubber, polypentenamer, polyoctenamer, and cyclopentene/dicyclopentadiene copolymer rubber. These examples are only illustrative and do not in any way limit the invention.

Examples of benzophenones used in this invention are 4,4'-bis(dimethylamino)-benzophenone, 4,4'-bis(diethylamino)benzophenone, 4,4'-bis(dibutylamino)benzophenone, 4,4'-diaminobenzophenone and 4-dimethylaminobenzophenone. Benzophenones having at least one amino group, an alkylamino group or dialkylamino group on one or both benzene rings are especially preferred. Also useful are benzophenones which have at least one alkoxy group, halogen or hydrocarbon radical as a substituent, such as 4,4'-diethoxybenzophenone, 3,4-dimethoxybenzophenone, 4,4'-dimethylbenzophenone, 3,3'-dicyclobenzophenone, 4-methyl-4'-methoxybenzophenone, 2,2',3,3'-tetramethylbenzophenone, and 2,2'-dichlorobenzophenone. Benzophenone itself having no substituent can also be used.

Comprehensively, the aforesaid benzophenones are represented by the following general formula

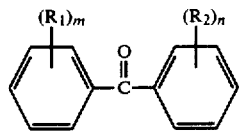

wherein $R_1$ and $R_2$ represent hydrogen, halogen, alkyl, alkenyl, alkoxy, amino, alkylamino or dialkylamino, and m and n represent integers whose total is from 1 to 10.

A highly unsaturated polymer rubber having a benzophenone introduced into its molecular chains can be prepared, for example, by a method which comprises adding the benzophenone into a solution of a living polymer rubber having an alkali metal bonded to the ends of its molecular chain obtained by polymerizing a diene-type monomer in the presence of an alkali metal-based catalyst, and reacting the living polymer rubber with the benzophenone; or by a method which comprises reacting a highly unsaturated polymer rubber in solution with, for example, an organic alkali metal compound to introduce the alkali metal, and thereafter reacting the polymer rubber with the benzophenone. The alkali metal-based catalyst may be those generally used in solution polymerization, for example lithium, sodium, rubidium, cesium, a complex of such a metal element with a hydrocarbon compound or a polar compound (such as n-butyllithium, 2-naphthyllithium, potassium-tetrahydrofuran complex, and potassium-diethoxyethane complex).

The amount of the benzophenone to be introduced into the highly unsaturated polymer rubber is, on an average, at least 0.1 mole, preferably at least 0.3 mole, more preferably at least 0.5 mole, especially preferably at least 0.7 mole, per mole of the rubber molecular chains. If it is less than 0.1 mole, no improvement in rebound can be obtained. The upper limit to the amount of the benzophenone introduced is 5 moles. If it is introduced in an amount of more than 5 moles, rubbery elasticity is lost.

The benzophenone introduced into the rubber molecular chains is bonded as an atomic grouping of the general formula

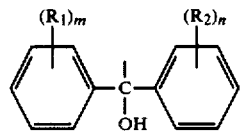

(wherein $R_1$, $R_2$, m and n are as defined) to the carbon atom in the rubber molecular chains.

The site into which the benzophenone is introduced may be any of the sites of the rubber molecular chain, but preferably its ends.

The highly unsaturated polymer rubber having the benzophenone introduced into the polymer chains should account for at least 10% by weight, preferably at least 20% by weight, of the entire rubber component of the rubber composition. If its amount is less than 10% by weight, the effect of improving rebound is small, and the object of the present invention cannot be achieved.

The highly unsaturated polymer rubber having the benzophenone introduced thereinto can be used in combination with other rubbers. Examples of the other rubbers are styrene/butadiene copolymer rubber obtained by emulsion polymerization, polybutadiene rubber obtained by emulsion polymerization, polybutadiene rubber (having a high cis 1,4-linkage content, a low cis 1,4-linkage content, a low and a high 1,2-linkage content, etc.) obtained by solution polymerization catalyzed by an alkali metal-based catalyst, a Ziegler catalyst or an alfin catalyst), styrene/butadiene copolymer rubber (having a combined styrene content of not more than 50% by weight, a low and a high 1,2-linkage content, etc.), polyisoprene rubber (having a high cis-1,4-linkage content, a low cis 1,4-linkage content, etc.), polyalkenamers, and natural rubber.

The Mooney viscosity ($ML_{1+4}$, 100° C.) of the highly unsaturated polymer rubber having the benzophenone introduced into the polymer chains is usually preferably 10 to 200, more preferably 20 to 150. If it is less than 10, mechanical properties such as tensile strength are inferior. If it exceeds 200, the miscibility of the highly unsaturated polymer rubber with another rubber is poor and processing of the rubber becomed difficult, with the result that the tensile strength and other properties of the resulting rubber composition are degraded.

The rubber component in the present invention may be used wholly or partly in the form of an oil-extended rubber.

The rubber composition of this invention is mixed, according to purposes and uses, with various compounding agents universally used in the rubber industry by using a mixer such as a roll mill or a Banbury mixer to form a rubber stock. The rubber stock is molded and vulcanized to produce the desired rubber product. Examples of the compounding agents include sulfur, stearic acid, zinc oxide, various vulcanization accelerators (for example, of the thiazole, thiuram and sulfenamide series), reinforcing agents such as various grades of carbon black (such as HAF and ISAF) and silica, fillers such as calcium carbonate and process oils.

Since the rubber composition of this invention provides a compromise between rebound and wet skid resistance at a high level, it is especially suitable as an automobile tire tread rubber material having improved safety and reduced fuel consumption. It can also be used as bicycle tires, shoe soles and floor materials.

The following examples illustrate the present invention more specifically.

PRODUCTION EXAMPLE

Production of rubber having a benzophenone introduced thereinto:

(1) Reaction of styrene/butadiene copolymer rubber (S-SBR for short) obtained by using a lithium-based catalyst, with a benzophenone:

A 2-liter stainless steel polymerization reactor was washed and dried and purged with dry nitrogen. Then, it was charged with 112.5 g of 1,3-butadiene, 37.5 g of styrene, 820 g of benzene, 0.75 g of tetrahydrofuran and 2.0 millimoles of n-butyllithium (as an n-hexane solution). With stirring, the mixture was subjected to polymerization at 45° C. for 2 hours. Then, 3.0 millimoles of 4,4'-bis(dimethylamino)benzophenone (to be abbreviated as MAB hereinafter) was added to the reaction mixture, and the mixture was stirred for 5 minutes to react the living polymer and MAB. The reaction mixture was then poured into a methanol solution containing 1 part by weight, of 2,6-di-t-butyl-p-cresol per 100 parts by weight of the (BHT) to coagulate the resulting polymer. The polymer was dried under reduced pressure at 60° C. for 24 hours, and its Mooney viscosity was measured [S-SBR (2*)]. The symbol * represents a rubber having a benzophenone introduced thereinto (this applies hereinafter).

For comparison, polymerization was carried out in accordance with the same polymerization recipe as above, and without reacting the polymer with MAB, the reaction mixture was poured into a methanol solution containing BHT to coagulate the resulting polymer. Thus, S-SBR having no MAB introduced thereinto was prepared [S-SBR (1)].

(2) Reaction of polybutadiene rubber obtained by using a lithium-based catalyst (abbreviated as S-BR), with a benzophenone:

A 2-liter stainless steel polymerization reactor was washed, dried, and purged with dry nitrogen. It was then charged with 150 g of 1,3-butadiene, 820 g of benzene, 0.3 to 0.5 millimole of diethylene glycol dimethyl ether (diglyme) and 1.3 millimoles of n-butyllithium (as an n-hexane solution). With stirring, the mixture was subjected to polymerization at 40° C. for 1 hour. Then, 1.5 moles, per mole of the catalyst, of 4,4'-bis(dimethylamino)benzophenone (to be abbreviated MAB) was added to the reaction mixture. The mixture was stirred for 5 minutes to react the living polymer with MAB.

The reaction mixture was then poured into a 1.5% by weight methanol solution of 2,6-di-t-butyl-p-cresol (BHT) to coagulate the resulting polymer. The polymer was dried under reduced pressure at 60° C. for 24 hours, and its Mooney viscosity was measured ([S-BR(2*), S-BR(4*), S-BR(6*), and S-BR(8*)].

For comparison, polymerization was carried out in accordance with the aforesaid polymerization recipe. Without reacting the polymer with MAB, the reaction mixture was poured into a methanol solution containing BHT to coagulate the polymer. It was dried to give S-BR having no MAB introduced thereinto [S-BR(1), S-BR(3), S-BR(5), and S-BR(7)].

(3) Reaction of a lithiation product of styrene/butadiene copolymer rubber (E-SBR for short) obtained by emulsion polymerization or a lithiation product of cis-1,4-polybutadiene rubber (cis BR for short) obtained by using a Ziegler catalyst, with a benzophenone:

Styrene/butadiene copolymer rubber (combined styrene content 35% by weight) [E-SBR(1)] obtained by usual emission polymerization, styrene/butadiene copolymer rubber (combined styrene content 40% by weight) [E-SBR (2)] obtained by usual emulsion polymerization, or cis 1,4-polybutadiene rubber (cis 1,4-linkage content 98 mole%; Nipol 1220 made by Nippon Zeon Co., Ltd.) obtained by using a Ziegler catalyst was dissolved in toluene, and coagulated with methanol. This operation was repreated twice to remove impurities, and then the product was dried in the same way as in (1) above.

In 1300 g of dry benzene was dissolved 130 g of the purified E-SBR(2) or cis BR(1), and 4.6 millimoles of n-butyllithium and 4.6 millimoles of tetramethyl ethylenediamine were added. The mixture was reacted at 70° C. for 1 hour. Then, 6.9 millimoles of MAB was added and reacted for 5 minutes. The reaction product was coagulated and dried in the same way as in (1) above [E-SBR(3*), cis BR(2*)].

Table 1 summarizes the properties of the polymer rubbers described in (1) to (3) above. The manner of bonding of the butadiene unit portion was measured by a usual infrared spectroscopic method. The amount of MAB introduced into the rubber molecular chains was measured by $^{13}C$-NMR.

TABLE 1

|  | Amount of combined styrene (wt. %) | Amount of 1,2-linkage unit (mole %) | Mooney viscosity $(ML_{1+4}, 100°$ C.) | Amount of MAB introduced (moles per mole of the rubber molecular chains) | Method of introducing MAB |
|---|---|---|---|---|---|
| S-SBR (1) | 24.9 | 35.5 | 55 | 0 |  |
| S-SBR (2*) | 24.8 | 36.0 | 53 | 0.9 | Method I |
| E-SBR (1) | 35 | — | 80 | 0 |  |
| E-SBR (2) | 40 | — | 70 | 0 |  |
| E-SBR (3*) | 40 | — | 78 | 2.7 | Method II |
| Cis BR (1) | — | — | 42 | 0 |  |
| Cis BR (2*) | — | — | 45 | 2.7 | Method II |
| S-BR (1) | — | 68 | 71 | 0 |  |
| S-BR (2*) | — | 68 | 69 | 0.9 | Method I |
| S-BR (3) | — | 70 | 40 | 0 |  |
| S-BR (4*) | — | 70 | 58 | 0.9 | Method II |
| S-BR (5) | — | 63 | 69 | 0 |  |
| S-BR (6*) | — | 63 | 70 | 0.9 | Method I |
| S-BR (7) | — | 75 | 67 | 0 |  |
| S-BR (8*) | — | 75 | 68 | 0.9 | Method I |

Footnote to Table 1
S-SBR: Styrene/butadiene copolymer rubber obtained by polymerization in the presence of lithium-based catalyst.
S-BR: Polybutadiene rubber obtained by polymerization in the presence of a lithium-based catalyst
E-SBR: Styrene-butadiene copolymer rubber obtained by emulsion polymerization
cis BR: Nipol 1220 (cis-1,4 linkage content 98 mole %, made by Nippon Zeon Co., Ltd.)
Method I: The living polymer rubber having Li bonded to the ends of the molecular chain is reacted with MAB.
Method II: The polymer rubber is reacted with a lithium compound and then with MAB.

EXAMPLE 1

Styrene/butadiene copolymer rubber obtained by polymerization with a lithium-based catalyst and reacted with MAB [S-SBR (2*)], the aforesaid styrene/butadiene copolymer not reacted with MAB [S-SBR (1)] or cis-1,4-polybutadiene rubber [cis BR(1)] obtained by polymerization with a Ziegler catalyst, and various compounding agents were kneaded in accordance with the compounding recipe shown in Table 2 in a Brabender-type mixer having a capacity of 250 ml to obtain rubber compositions. Sulfur and the vulcanization accelerator were added in amounts which would give an optimal vulcanized state when each of the rubber compositions was vulcanized.

Each of these rubber compositions was press-cured at 160° C. for 15 to 25 minutes to form test pieces.

TABLE 2

| Compounding recipe | |
|---|---|
| Ingredient | Parts by weight |
| Starting rubber (see Tables 3 to 7) | 100 |
| HAF carbon black | 50 |
| Aromatic process oil | 10 |
| ZnO (No. 3) | 3 |
| Stearic acid | 2 |
| Sulfur N—oxydiethylene-2-benzothiazyl sulfenamide or N—cyclohexyl-2-benzothiazyl sulfenamide | Varying amounts (see Tables 3 to 7) |

The properties of vulcanizates of the resulting rubber compositions were measured. The results are shown in Table 3.

The rebound was measured at 53° C. by a Dunlop Tripso Meter.

The wet skid resistance was measured at 23° C. by a portable skid tester (made by Stanley Company, Britain) on a road surface of ASTM E-303-74 (a black safety walk, outdoor use type B by 3M Company).

rebound. Furthermore, by comparing a mixture of S-SBR(1) and S-SBR(2*) (Run No. 7) with a mixture of S-SBR(1) and cis BR(1) (Run No. 3) which is a conventional tire tread composition, it is seen that the former has markedly improved wet skid resistance and rebound over the latter.

EXAMPLE 2

Styrene/butadiene copolymer rubber obtained by polymerization with a lithium-based catalyst and having MAB introduced thereinto [B-SBR(2*)], the aforesaid styrene/butadiene copolymer rubber having no MAB introduced thereinto [S-SBR(1)], and polybutadiene rubber obtained by polymerization with a lithium-based catalyst and having MAB introduced thereinto [S-BR(2*), S-BR(4*), S-BR(8*)] or the aforesaid rubbers having no MAB introduced thereinto [S-BR(1), S-BR(3), S-BR(7)] and various compounding agents were kneaded in accordance with the compounding recipe shown in Table 2 in the same way as in Example 1 to form various rubber compositions.

Each of these rubber compositions was press-cured at 160° C. for 15 to 25 minutes to prepare test pieces which were tested in the same way as in Example 1. The results are summarized in Tables 4-1 and 4-2.

TABLE 4-1

| | Run No. | | | | | | | | | | | | |
|---|---|---|---|---|---|---|---|---|---|---|---|---|---|
| | Comparison | | | | Invention | | | Comparison | | | Invention | | |
| Test item | 13 | 14 | 15 | 16 | 17 | 18 | 19 | 20 | 21 | 22 | 23 | 24 | 25 |
| S-SBR (1) | 100 | — | 90 | 50 | — | 90 | 50 | — | 90 | 50 | — | 90 | 50 |
| S-BR (1) | — | 100 | 10 | 50 | — | — | — | — | — | — | — | — | — |
| S-BR (2*) | — | — | — | — | 100 | 10 | 50 | — | — | — | — | — | — |
| S-BR (3) | — | — | — | — | — | — | — | 100 | 10 | 50 | — | — | — |
| S-BR (4*) | — | — | — | — | — | — | — | — | — | — | 100 | 10 | 50 |
| Sulfur (parts by weight) | 1.8 | 1 | 1.8 | 1.8 | 1 | 1.8 | 1.8 | 1 | 1 | 1.8 | 1 | 1.8 | 1.8 |
| Vulcanization accelerator (parts by weight) | 1.4 | 2 | 1.4 | 1.4 | 2 | 1.4 | 1.4 | 2 | 1.4 | 1.4 | 2 | 1.4 | 1.4 |
| Rebound (%) | 59 | 57 | 58 | 55 | 65 | 60 | 63 | 55 | 58 | 56 | 60 | 60 | 61 |
| Wet skid resistance | 75 | 76 | 75 | 76 | 76 | 75 | 76 | 78 | 75 | 76 | 78 | 75 | 76 |
| Tensile strength (kg/cm$^2$) | 229 | 185 | 212 | 196 | 188 | 215 | 201 | 178 | 210 | 190 | 175 | 215 | 200 |
| Elongation (%) | 440 | 400 | 430 | 420 | 400 | 430 | 410 | 390 | 430 | 420 | 385 | 430 | 410 |
| 300% Tensile stress (kg/cm$^2$) | 130 | 126 | 130 | 128 | 128 | 130 | 129 | 123 | 129 | 126 | 130 | 130 | 128 |

Note:
The vulcanization accelerator is N—cyclohexyl-2-benzothiazyl sulfenamide when its amount is 1.4 parts by weight, and N—oxydiethylene-2-benzothiazyl sulfenamide when its amount is 2 parts by weight.

TABLE 3

| | Run No. | | | | | | | | | | | |
|---|---|---|---|---|---|---|---|---|---|---|---|---|
| | Comparison | | | | Invention | | | | | | | |
| Test item | 1 | 2 | 3 | 4 | 5 | 6 | 7 | 8 | 9 | 10 | 11 | 12 |
| S-SBR (1) | 100 | — | 70 | 50 | — | 80 | 70 | 50 | 20 | — | — | — |
| S-SBR (2*) | — | — | — | — | 100 | 20 | 30 | 50 | 80 | 90 | 70 | 50 |
| Cis BR (1) | — | 100 | 30 | 50 | — | — | — | — | — | 10 | 30 | 50 |
| Sulfur | 1.8 | 1.8 | 1.8 | 1.8 | 1.8 | 1.8 | 1.8 | 1.8 | 1.8 | 1.8 | 1.8 | 1.8 |
| Vulcanization accelerator | 1.4 | 1.4 | 1.4 | 1.4 | 1.4 | 1.4 | 1.4 | 1.4 | 1.4 | 1.4 | 1.4 | 1.4 |
| Rebound (%) | 59 | 61 | 59 | 60 | 65 | 61 | 62 | 63 | 64 | 64 | 64 | 63 |
| Wet skid resistance | 75 | 50 | 67 | 62 | 75 | 75 | 75 | 75 | 75 | 72 | 67 | 62 |
| Tensile strength (kg/cm$^2$) | 229 | 185 | 213 | 196 | 228 | 226 | 230 | 230 | 225 | 220 | 214 | 202 |
| Elongation (%) | 440 | 430 | 440 | 440 | 420 | 430 | 440 | 430 | 430 | 430 | 440 | 430 |
| 300% Tensile stress (kg/cm$^2$) | 130 | 113 | 122 | 120 | 136 | 133 | 133 | 135 | 136 | 130 | 124 | 123 |

Note:
The vulcanization accelerator is N—cyclohexyl-2-benzothiazyl sulfenamide.

By comparing S-SBR (1) (Run No. 1) containing no benzophenone with S-SBR (2*) (Run No. 5) containing a benzophenone introduced therein, it is seen that the introduction of the benzophenone led to an improved

TABLE 4-2

| | Run No. | | | | | | |
|---|---|---|---|---|---|---|---|
| | Comparison | | Invention | | | | |
| Test item | 26 | 27 | 28 | 29 | 30 | 31 | 32 |
| S-SBR (1) | — | 50 | — | 50 | — | — | — |

TABLE 4-2-continued

| | Run No. | | | | | | |
|---|---|---|---|---|---|---|---|
| | Comparison | | Invention | | | | |
| Test item | 26 | 27 | 28 | 29 | 30 | 31 | 32 |
| S-SBR (2*) | — | — | — | — | 100 | 50 | 50 |
| S-BR (7) | 100 | 50 | — | — | — | 50 | — |
| S-BR (8*) | — | — | 100 | 50 | — | — | 50 |
| Sulfur (parts by weight) | 1 | 1.8 | 1 | 1.8 | 1.8 | 1.8 | 1.8 |
| Vulcanization accelerator | 2 | 1.4 | 2 | 1.4 | 1.4 | 1.4 | 1.4 |
| Rebound (%) | 55 | 55 | 65 | 63 | 65 | 61 | 65 |
| Wet skid resistance | 78 | 77 | 78 | 77 | 75 | 77 | 77 |
| Tensile strength (kg/cm$^2$) | 180 | 199 | 190 | 205 | 228 | 197 | 210 |
| Elongation (%) | 390 | 420 | 400 | 420 | 420 | 410 | 430 |
| 300% Tensile stress (kg/cm$^2$) | 125 | 130 | 129 | 132 | 136 | 134 | 131 |

Note:
The vulcanization accelerators used were as indicated in the footnote to Table 4-1.

In the case of the combination of S-SBR having no MAB and S-BR having no MAB (comparison), the rebound is below additivity, but if at least one of these components has MAB introduced thereinto (invention), the rebound is above additivity, as shown in Tables 4-1 and 4-2.

EXAMPLE 3

Styrene/butadiene copolymer rubber (combined styrene content 35%) [E-SBR(1)] obtained by emulsion polymerization, E-SBR (3*) obtained by lithiating E-SBR(2) and then reacting the product with MAB, cis 1,4-polybutadiene rubber [cis BR(1)] obtained by using a Ziegler catalyst, or cis BR(2*) obtained by lithiating cis BR(1) and then reacting the product with MAB, and various compounding agents (sulfur was used in an amount of 1.8 parts by weight, and N-cyclohexyl-2-benzothiazyl sulfenamide as a vulcanization accelerator was used in an amount of 1.4 parts by weight) were kneaded by the same operation as in Example 1 in accordance with the compounding recipe shown in Table 2 to give various rubber compositions. Each of these rubber compositions was press-cured at 160° C. for 15 to 25 minutes to prepare test pieces, which were tested in the same way as in Example 1. The results are shown in Table 5.

EXAMPLE 4

A 50:50 (by weight) mixture of natural rubber (abbreviated NR) and polybutadiene rubber obtained by polymerizing with a lithium-based catalyst [S-BR(1), S-BR(5) or S-BR(7)] or rubber obtained by introducing MAB into the aforesaid rubber [S-BR(2*), S-BR(6*) or S-BR (8*)], and various compounding agents were mixed by the same operation as in Example 1 in accordance with the compounding recipe shown in Table 2 to give various rubber compositions. Each of the rubber compositions was press-cured at 160° C. for 15 minutes to prepare test pieces, which were tested in the same way as in Example 1. The results are shown in Table 6.

TABLE 6

| | Run No. | | | | | | | |
|---|---|---|---|---|---|---|---|---|
| | Comparison | | | | Invention | | | |
| Test item | 44 | 45 | 46 | 47 | 48 | 49 | 50 | 51 |
| NR | 100 | 50 | 50 | 50 | — | 50 | 50 | 50 |
| S-BR (1) | — | 50 | — | — | — | — | — | — |
| S-BR (2*) | — | — | — | — | — | 50 | — | — |
| S-BR (5) | — | — | 50 | — | — | — | — | — |
| S-BR (6*) | — | — | — | — | 100 | — | 50 | — |
| S-BR (7) | — | — | — | 50 | — | — | — | — |
| S-BR (8*) | — | — | — | — | — | — | — | 50 |
| Sulfur | 2.0 | 1.5 | 1.5 | 1.5 | 1.5 | 1.5 | 1.5 | 1.5 |
| Vulcanization accelerator | 0.8 | 1.4 | 1.4 | 1.4 | 1.4 | 1.4 | 1.4 | 1.4 |
| Rebound (%) | 63 | 62 | 62 | 60 | 65 | 66 | 66 | 65 |
| Wet skid resistance | 68 | 73 | 71 | 74 | 74 | 73 | 71 | 74 |
| Tensile strength (kg/cm$^2$) | 301 | 211 | 212 | 213 | 185 | 194 | 205 | 193 |
| Elongation (%) | 530 | 450 | 440 | 440 | 400 | 400 | 410 | 390 |
| 300% Tensile stress (kg/cm$^2$) | 164 | 122 | 122 | 125 | 126 | 133 | 131 | 132 |

Note:
The vulcanization accelerator is N—oxydiethylene-2-benzothiazyl sulfenamide.

EXAMPLE 5

Styrene/butadiene copolymer rubber having 4,4'-diaminobenzophenone introduced thereinto [S-SBR (2'*) having the same properties as S-SBR(2*)] was prepared by repeating the procedure of Section (1) of Production Example except that the aforesaid benzophenone was used instead of MAB. Furthermore, polybutadiene rubber having 4,4'-diaminobenzophenone introduced thereinto [S-BR(2'*) having the same properties as S-BR(2*)] was prepared by repeating Section (2) of Production Example except that the aforesaid benzophenone was used instead of MAB.

Each of these rubbers and various compounding agents were mixed in the same way as in Example 1 in accordance with the compounding recipe shown in Table 2 to give various rubber compositions. Each of these rubber compositions was press-cured at 160° C. for 15 to 25 minutes to prepare test pieces, which were tested in the same way as in Example 1. The results are shown in Table 7.

TABLE 5

| | Run No. | | | | | | | | | | |
|---|---|---|---|---|---|---|---|---|---|---|---|
| | Comparison | | | Invention | | Comparison | | Invention | | | |
| Test item | 33 | 34 | 35 | 36 | 37 | 38 | 39 | 40 | 41 | 42 | 43 |
| E-SBR (1) | 100 | — | 50 | — | 50 | — | — | — | — | — | — |
| E-SBR (2) | — | — | — | — | — | 100 | 50 | 50 | — | — | — |
| E-SBR (3*) | — | — | — | — | — | — | — | — | 100 | 50 | 50 |
| Cis BR (1) | — | 100 | 50 | — | — | — | 50 | — | — | 50 | — |
| Cis BR (2*) | — | — | — | 100 | 50 | — | — | 50 | — | — | 50 |
| Rebound (%) | 46 | 61 | 53 | 66 | 60 | 42 | 56 | 59 | 47 | 60 | 63 |
| Wet skid resistance | 81 | 50 | 73 | 50 | 73 | 82 | 73 | 73 | 82 | 73 | 73 |
| Tensile strength (kg/cm$^2$) | 280 | 185 | 226 | 178 | 229 | 275 | 230 | 235 | 270 | 230 | 238 |
| Elongation (%) | 490 | 430 | 460 | 420 | 450 | 500 | 460 | 460 | 490 | 450 | 460 |
| 300% Tensile stress (kg/cm$^2$) | 148 | 113 | 129 | 119 | 135 | 150 | 131 | 135 | 153 | 136 | 134 |

TABLE 7

| Test item | Comparison | | | Invention | | | |
|---|---|---|---|---|---|---|---|
| Run No. | 52 | 53 | 54 | 55 | 56 | 57 | 58 |
| S-SBR (1) | 100 | — | 50 | — | — | 50 | 80 |
| S-SBR (2'*) | — | — | — | 100 | — | — | 20 |
| S-BR (1) | — | 100 | 50 | — | — | — | — |
| S-BR (2'*) | — | — | — | — | 100 | 50 | — |
| Sulfur | 1.8 | 1 | 1.8 | 1.8 | 1 | 1.8 | 1.8 |
| Vulcanization accelerator | 1.4 | 2 | 1.4 | 1.4 | 2 | 1.4 | 1.4 |
| Rebound (%) | 59 | 57 | 55 | 64 | 64 | 61 | 61 |
| Wet skid resistance | 75 | 76 | 76 | 75 | 76 | 76 | 75 |
| Tensile strength (kg/cm$^2$) | 229 | 185 | 196 | 225 | 188 | 199 | 228 |
| Elongation (%) | 440 | 400 | 420 | 430 | 400 | 410 | 430 |
| 300% Tensile stress (kg/cm$^2$) | 130 | 126 | 128 | 136 | 130 | 130 | 131 |

Note:
The vulcanization accelerators used were as indicated in the footnote to Table 4-1.

What is claimed is:

1. A sulfur-vulcanizable rubber composition comprising 10 to 100% by weight of a highly unsaturated polymer rubber having a Mooney viscosity (ML$_{1+4}$, 100° C.) of 10 to 200, wherein at least 0.1 mol, per mol of the rubber molecular chain, of a benzophenone group represented by formula

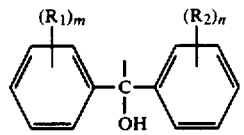

wherein R$_1$ and R$_2$ represent amino, alkylamino or dialkylamino, and m and n represent intergers whose total is from 1 to 10, is bonded to a carbon atom in the rubber molecular chain, and 90 to 0% by weight of at least one rubber selected from diene rubbers, polyalkenamers and natural rubber.

2. The rubber composition of claim 1 wherein the highly unsaturated polymer rubber is a rubber wherein said benzophenone group is bonded to the ends of the rubber molecular chain.

3. The rubber composition of claim 1 wherein the highly unsaturated polymer rubber is a rubber wherein said benzophenone group is randomly bonded to the rubber molecular chain.

4. The rubber composition of claim 1 wherein the highly unsaturated polymer rubber to which the benzophenone group is bonded is at least one rubber selected from the group consisting of polybutadiene rubber, polyisoprene rubber, polychloroprene rubber, styrene/butadiene copolymer rubber, styrene/isoprene copolymer rubber, butadiene/isoprene copolymer rubber, acrylonitrile/butadiene copolymer rubber, polypentadiene rubber, butadiene/piperylene copolymer rubber, butadiene/propylene copolymer rubber, polypentenamer polyoctenamer and cyclopentene/dicyclopentadiene copolymer rubber.

5. The rubber composition of claim 1 wherein the amount of the benzophenone group bonded to the highly unsaturated polymer rubber is from 0.3 mol to 5 mols, per mol of the rubber molecular chain.

6. The rubber composition of claim 1 which comprises a mixture of polybutadiene rubber having a cis 1,4-linkage content of at least 80 mole% to which said benzophenone group is bonded, and a styrene/butadiene copolymer rubber having a combined styrene content of at least 30% by weight.

7. The rubber composition of claim 1 which comprises a mixture of a styrene/butadiene copolymer rubber having a combined styrene content of at least 30% by weight to which said benzophenone group is bonded and a polybutadiene rubber having a cis 1,4-linkage content of at least 80 mole% by weight.

8. The rubber composition of claim 1 which comprises a mixture of polybutadiene rubber having a cis 1,4-linkage content of at least 80 mole% and a styrene/butadiene copolymer rubber having a combined styrene content of at least 30% by weight, each of said rubbers being bonded to a benzophenone group represented by the formula.

9. The rubber composition of claim 1 wherein the benzophenone group of the formula is derived from a benzophenone compound selected from the group consisting of 4,4'-bis(dimethylamino)-benzophenone, 4,4'-bis(ethylamino)-benzophenone, 4,4'-bis(dibutylamino)-benzophenone, 4,4'-diaminobenzophenone and 4-dimethylaminobenzophenone.

10. The rubber composition of claim 1 further comprising a sulfur vulcanization system.

11. The rubber composition of claim 10 wherein the sulfur vulcanization system comprises sulfur and a vulcanization accelerator selected from the group consisting of thiazole compounds, thiuram compounds, and sulfenamide compounds.

12. A vulcanized rubber composition obtained by vulcanizing the sulfur-vulcanizable rubber composition of claim 10.

* * * * *